United States Patent
Miyata et al.

(10) Patent No.: US 6,994,648 B2
(45) Date of Patent: Feb. 7, 2006

(54) FLUID PRESSURE CONTROL CIRCUIT

(75) Inventors: Hideki Miyata, Okazaki (JP); Masaru Morise, Toyota (JP); Akio Sugawara, Toyota (JP); Yuji Yasuda, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 126 days.

(21) Appl. No.: 10/815,866

(22) Filed: Apr. 2, 2004

(65) Prior Publication Data

US 2004/0204280 A1    Oct. 14, 2004

(30) Foreign Application Priority Data

Apr. 9, 2003    (JP)    .............................. 2003-105915

(51) Int. Cl.
*F16H 61/06*    (2006.01)

(52) U.S. Cl. ..................................... 475/128; 192/85 R

(58) Field of Classification Search ................ 475/116, 475/127, 128
See application file for complete search history.

(56) References Cited

U.S. PATENT DOCUMENTS

| | | | | |
|---|---|---|---|---|
| 4,487,304 A | * | 12/1984 | Young ....................... | 192/85 R |
| 4,747,808 A | * | 5/1988 | Moan ......................... | 474/28 |
| 4,889,016 A | * | 12/1989 | Kuwayama et al. ......... | 477/151 |
| 5,054,599 A | * | 10/1991 | Marcott .................... | 192/85 R |
| 5,342,253 A | * | 8/1994 | Mizobe et al. .............. | 475/128 |
| 5,366,420 A | * | 11/1994 | Kuriyama et al. ........ | 192/85 R |
| 5,722,459 A | * | 3/1998 | Kim et al. ............. | 137/625.64 |
| 5,957,260 A | * | 9/1999 | Kunii ....................... | 192/85 R |
| 6,089,364 A | * | 7/2000 | Kunii ....................... | 192/85 R |
| 6,350,214 B1 | * | 2/2002 | Murasugi ..................... | 475/128 |
| 6,499,577 B2 | * | 12/2002 | Kitamoto et al. ......... | 192/85 R |
| 6,591,958 B1 | * | 7/2003 | Moorman ................. | 192/85 R |
| 2004/0206076 A1 | * | 10/2004 | Morise et al. ................ | 60/459 |

FOREIGN PATENT DOCUMENTS

| | | |
|---|---|---|
| JP | 5-196127 | 8/1993 |
| JP | 5-215223 | 8/1993 |
| JP | 6-34036 | 2/1994 |
| JP | 7-88898 | 9/1995 |
| JP | 8-326912 | 12/1996 |

\* cited by examiner

*Primary Examiner*—Sherry Estremsky
(74) *Attorney, Agent, or Firm*—Oblon, Spivak, McClelland, Maier & Neustadt, P.C.

(57) ABSTRACT

A pair of feedback chambers is provided in a supply/discharge switching control valve, and the hydraulic pressure is introduced from a portion on the upstream side of the orifice provided in the communication passage through the second feedback passage, and is introduced from a portion on the downstream side of the orifice provided in the communication passage through the first feedback passage. Therefore, the responsiveness is enhanced, compared with the case where only the first feedback chamber is provided. Also, the overshoot and the undershoot of the fluid pressure, and the pressure fluctuation are effectively suppressed, compared with the case where only the second feedback chamber is provided. Also, by appropriately setting the pressure receiving area of the spool in the first feedback chamber and the pressure receiving area of the spool in the second feedback chamber, and the circulation cross sectional areas of the orifices, it is possible to easily tune the responsiveness, and the overshoot and the undershoot of the fluid pressure, the pressure fluctuation and the like, according to the performance required of the hydraulic pressure device.

11 Claims, 4 Drawing Sheets

FIG.2

| POSITION | | CLUTCHES AND BRAKES | | | | | | | O.W.C. | |
|---|---|---|---|---|---|---|---|---|---|---|
| | | C1 | C0 | C2 | B1 | B2 | C3 | B3 | F1 | F2 |
| N,P | | × | × | × | × | × | × | ○ | × | × |
| R | | × | × | ○ | × | ○ | × | ○ | × | × |
| D | 1st | ○ | × | × | × | × | × | ○ | ○ | △ |
| | 2nd | ○ | × | × | ○ | × | × | ○ | × | △ |
| | 3rd | ○ | ○ | × | × | × | × | ○ | × | △ |
| | 4th | × | ○ | × | ○ | × | × | ○ | × | △ |
| | 5th | × | ○ | × | ○ | × | ○ | × | × | × |
| | 1st ENGINE BRAKE | ○ | × | × | × | ○ | × | ○ | △ | △ |

FLUID PRESSURE CONTROL CIRCUIT

INCORPORATION BY REFERENCE

The disclosure of Japanese Patent Application No. 2003-105915 filed on Apr. 9, 2003 including its specification, drawings and abstract is incorporated herein by reference in its entirety.

BACKGROUND OF THE INVENTION

1. Field of the Invention

The invention relates to a fluid pressure control circuit. More particularly, the invention relates to a technology for enhancing performance of supplying fluid to/discharging fluid from a fluid pressure device.

2. Description of the Related Art

A fluid pressure control circuit including a fluid pressure device and a control valve is used, for example, in a transmission for a vehicle. The fluid pressure device is operated by a fluid pressure. The control valve includes a supply/discharge port through which the fluid is supplied/discharged, and a communication port which is connected to the fluid pressure device through a communication passage. The control valve controls the fluid pressure of the fluid pressure device by changing a flow amount of the fluid to be supplied to or to be discharged from the fluid pressure device through the communication port and the supply/discharge port, the flow amount of the fluid being changed by the change in the state of communication (hereinafter, referred to as the "communication state") between the communication port and the supply/discharge port according to the movement of a valve element, the movement of the valve element being determined by a ratio between i) the fluid pressure to be introduced from the communication passage into a feedback chamber and ii) a predetermined pressure regulating load. An example of such a fluid pressure control circuit is a hydraulic control circuit disclosed in Japanese Patent Laid-Open Publication No. JP-A-05-196127. The hydraulic control circuit includes a control valve which is provided with a supply port through which a fluid is supplied from an oil pump or the like, a discharge port through which the fluid is discharged, and a communication port to which the communication passage is connected. The control valve controls the fluid pressure by changing a flow amount of the fluid to be supplied to or to be discharged from the fluid pressure device, the flow amount of the fluid being changed by the communication state among the supply port, the discharge port and the communication port, the communication state being continuously changed according to a position of the valve element.

In such a fluid pressure control circuit, the fluid pressure of the fluid to be introduced from the communication passage to the feedback chamber does not always reflect the fluid pressure of the fluid pressure device due to the circulation resistance of the communication passage, which is caused when the fluid is being supplied/discharged or the fluid pressure is being changed. The fluid pressure in the feedback chamber is increased or decreased before the fluid pressure is changed. Accordingly, it is difficult to obtain sufficient responsiveness. If the fluid to be introduced to the feedback chamber is obtained at a position as close as possible to the fluid pressure device, the responsiveness is enhanced. However, when the supply of the fluid, the discharge of the fluid, or the change in the fluid pressure ends, that is, when a piston of a hydraulic cylinder reaches the end of the stroke, the fluid pressure may overshoot or undershoot. Also, fluctuation of the pressure (hereinafter, referred to as "pressure fluctuation") is likely to occur due to the overshoot or the undershoot of the fluid pressure.

SUMMARY OF THE INVENTION

It is an object of the invention to enhance responsiveness while suppressing an overshoot and an undershoot of a fluid pressure, pressure fluctuation, and the like, when a fluid is being supplied/discharged, a fluid pressure is being changed, or the like.

A fluid pressure control circuit according to a first aspect includes (a) a fluid pressure device which is operated by a fluid pressure, and (b) a control valve that includes a supply/discharge port through which the fluid is supplied/discharged, and a communication port which is connected to the fluid pressure device through a communication passage, and that controls the fluid pressure of the fluid pressure device by changing a flow amount of the fluid to be supplied to or to be discharged from the fluid pressure device through the communication port and the supply/discharge port, the flow amount of the fluid being changed by the change in the communication state between the communication port and the supply/discharge port according to the movement of a valve element, the movement of the valve element being determined by a ratio between i) the fluid pressure to be introduced from the communication passage and ii) a predetermined pressure regulating load. The fluid pressure control circuit further includes (c) a circulation regulating mechanism provided in the communication passage, for regulating circulation of the fluid, (d) a first feedback chamber and a second feedback chamber which are provided, as the feedback chambers, in the control valve and which respectively apply the fluid pressure to the valve element in the same direction, (e) a first feedback passage which introduces the fluid to the first feedback chamber from a portion that is between the circulation regulating mechanism and the control valve in the communication passage, and (f) a second feedback passage which introduces the fluid to the second feedback chamber from a portion that is between the circulation regulating mechanism and the fluid pressure device in the communication passage.

In such a fluid pressure control circuit, the first feedback chamber and the second feedback chamber, which make a pair, are provided in the control valve. Then, the fluid pressure is introduced from a portion on the upstream side of the circulation regulating mechanism through the second feedback passage, and is introduced from a portion on the downstream side of the circulation regulating mechanism through the first feedback passage. Therefore, the responsiveness is enhanced, compared with the case where only the first feedback chamber is provided. Also, the overshoot and the undershoot of the fluid pressure and the pressure fluctuation are suppressed effectively, compared with the case where only the second feedback chamber is provided.

Also, by appropriately setting the pressure receiving area of the valve element in the first feedback chamber and the pressure receiving area of the valve element in the second feedback chamber, and by appropriately setting the cross sectional area of a portion through which the fluid actually circulates in the first feedback passage (hereinafter, referred to as a "circulation cross sectional area of the first feedback passage") and the cross sectional area of a portion through which the fluid actually circulates in the second feedback passage (hereinafter, referred to as a "circulation cross sectional area of the second feedback passage"), it is possible to easily tune the responsiveness, and the overshoot and the undershoot of the fluid pressure, the pressure fluctuation and the like, according to the performance required of the fluid pressure device. When importance is placed on the responsiveness, the pressure receiving area of the valve element in the second feedback chamber and the circulation cross sectional area of the second feedback passage are increased relatively, and the effect of the fluid pressure in the second feedback passage is increased. When importance is placed on the prevention of the overshoot and the undershoot of the fluid pressure and pressure fluctuation, the pressure receiving area of the valve element in the second feedback chamber and the circulation cross sectional area of the second feedback passage are decreased relatively, and the effect of the fluid pressure in the second feedback passage is reduced.

The fluid pressure control circuit according to the invention is appropriately applied to a transmission for a vehicle, such as a planetary gear type transmission in which shifting is performed according to engagement/disengagement of a hydraulic friction engaging device such as a clutch and a brake, and a belt type continuously variable transmission in which a groove width and a belt holding force of a pulley are controlled by a hydraulic cylinder. In this case, it is possible to obtain desired shifting responsiveness, while suppressing pressure fluctuation and the like and decreasing the time required for shifting. The fluid pressure control circuit according to the invention can be applied to fluid pressure control circuits for mechanisms other than a transmission. Each of the hydraulic friction engaging device and the hydraulic cylinder corresponds to a fluid pressure device. The fluid pressure control circuit according to the invention can be applied not only to a fluid pressure control circuit using liquid such as operating oil, but also to various fluid pressure control circuits using gas such as air or another fluid.

The valve element of the control valve is, for example, a spool which linearly reciprocates. For example, the valve element is configured to control the fluid pressure of the fluid pressure device by continuously changing the communication state among the supply port through which the fluid is supplied from the oil pump or the like, the discharge port through which the fluid is discharged, and the communication port to which the communication passage is connected, the communication state being changed according to the movement of the spool, the movement of the spool being determined such that the ratio between i) the fluid pressure to be introduced to the first feedback chamber and the second feedback chamber and ii) the pressure regulating load are opposed to each other and then become equal to each other. The control valve may be a valve which is used when the fluid is supplied to the fluid pressure device, may be a valve which is used when the fluid is discharged from the fluid pressure device, or may be a valve which is used in both supply and discharge of the fluid. The supply/discharge port may be one of the supply port through which the fluid is supplied from the oil pump or the like and the discharge port through which the fluid is discharged. The supply/discharge port may be provided with both the supply port and the discharge port. Also, the supply/discharge port may be one single supply/discharge port which serves as both the supply port and the discharge port. In this case, the function of the port is switched between the function as the supply port and the function as the discharge port by changing the state of the circuit.

The circulation regulating mechanism causes a difference in the fluid pressure between the upstream side and the down stream side of the circulation regulating mechanism using the circulation resistance according to the flow amount of the fluid. An orifice which regulates the circulation cross sectional area is preferably used. However, a relatively long passage in which the pressure is decreased due to the circulation resistance may be used as it is, as the circulation regulating mechanism.

In each of the first feedback passage and the second feedback passage, the circulation regulating mechanism such as an orifice is formed as required. By regulating the flow amount of the fluid using the circulation regulating mechanism, it is possible to tune the responsiveness and the overshoot and the undershoot of the fluid pressure, the pressure fluctuation and the like, according to the performance required of the fluid pressure device.

A fluid pressure control circuit according to a second aspect includes (a) a fluid pressure device which is operated by a fluid pressure, and (b) a control valve that includes a supply/discharge port through which the fluid is supplied/discharged, and a communication port which is connected to the fluid pressure device through a communication passage, and that controls the fluid pressure of the fluid pressure device by changing a flow amount of the fluid to be supplied to or to be discharged from the fluid pressure device through the communication port and the supply/discharge port, the flow amount of the fluid being changed by the change in the communication state between the communication port and the supply/discharge port according to the movement of a valve element, the movement of the valve element being determined by a ratio between i) the fluid pressure to be introduced from the communication passage and ii) a predetermined pressure regulating load. The fluid pressure control circuit further includes (c) circulation regulating means provided in the communication passage, for regulating circulation of the fluid, (d) a first feedback chamber and a second feedback chamber which are provided, as the feedback chambers, in the control valve and which respectively apply the fluid pressure to the valve element in the same direction, (e) a first feedback passage which introduces the fluid to the first feedback chamber from a portion that is between the circulation regulating means and the control valve in the communication passage, and (f) a second feedback passage which introduces the fluid to the second feedback chamber from a portion that is between the circulation regulating means and the fluid pressure device in the communication passage.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 2 is a table showing engaged/disengaged states of clutches and applied/released states of brakes for achieving each shift speed of an automatic transmission in FIG. 1;

DETAILED DESCRIPTION OF THE PREFERRED EMBODIMENTS

Figure 1:
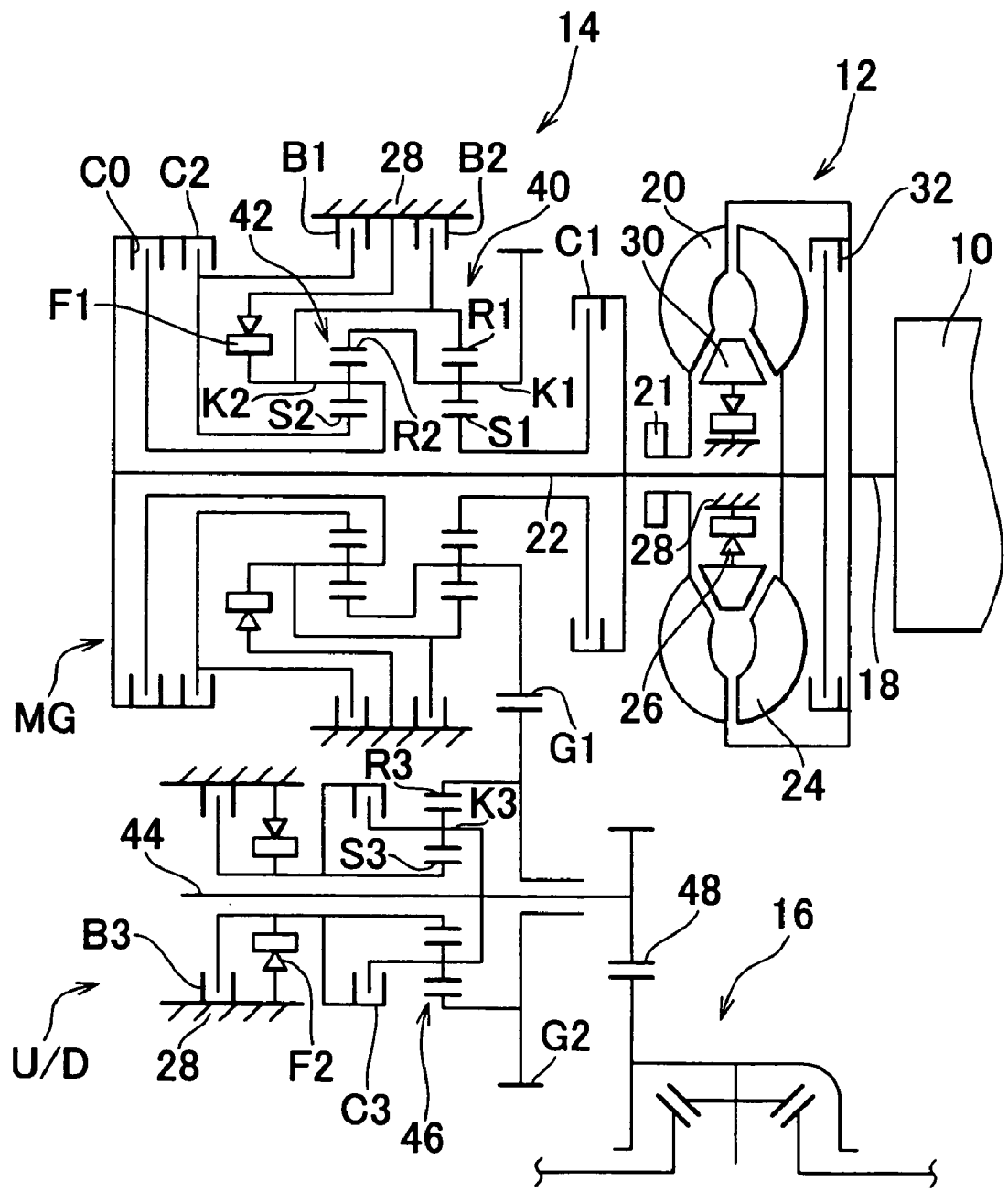
FIG. 1 is a view schematically showing a configuration of a drive-train unit for a vehicle, to which the invention is applied.

Hereafter, an embodiment of the invention will be described in detail with reference to accompanying drawings. FIG. 1 is a view schematically showing a transverse drive-train unit for a vehicle such as a FF (front engine-front drive) vehicle. The output from an engine 10, such as a gasoline engine, which generates power due to combustion of fuel is transmitted to drive wheels (front wheels) (not shown) via a torque converter 12, an automatic transmission 14 and a differential gear unit 16. The torque converter 12 includes a pump impeller 20 which is coupled to a crank shaft 18 of the engine 10; a turbine runner 24 which is coupled to an input shaft 22 of the automatic transmission 14; a stator 30 which is fixed to a housing 28, that is a non-rotating member, via a one-way clutch 26; and a lockup clutch 32 which directly connects a crank shaft 18 to the input shaft 22 via a damper (not shown). A mechanical oil pump 21 such as a gear pump is coupled to the pump impeller 20, and is driven by the engine 10 so as to rotate together with the pump impeller 20. The hydraulic pressure for shifting and lubrication is thus generated. The engine 10 is a driving force source for running of the vehicle, and the torque converter 12 is a hydrodynamic power transmission device.

The automatic transmission 14 is provided with the input shaft 22, a first planetary gear set 40, a second planetary gear set 42, a third planetary gear set 46, and an output gear 48. All the first planetary gear set 40, the second planetary gear set 42 and the third planetary gear set 46 are single pinion type. The first planetary gear set 40 and the second planetary gear set 42 are provided coaxially with the input shaft 22, and form a so-called CR-CR coupled planetary gear mechanism when a carrier of the first planetary gear set 40 is coupled to a ring gear of the second planetary gear set 42, and a carrier of the second planetary gear set 42 is coupled to a ring gear of the first planetary gear set 40. The third planetary gear set 46 is provided coaxially with a counter shaft 44 which is in parallel with the input shaft 22. The output gear 48 is fixed to an end of the counter shaft 44 and is meshed with the differential gear unit 16. The elements of each of the planetary gear sets 40, 42 and 46, that is, a sun gear, the ring gear and the carrier, which rotably supports planetary gears that are meshed with the sun gear and the ring gear, are selectively coupled to each other or coupled to the input shaft 22 by four clutches C0, C1, C2, and C3, and are selectively coupled to the housing 28, which is a non-rotatable member, by three brakes B1, B2 and B3. Also, the elements of the planetary gear sets 40, 42 and 46 are coupled to each other or coupled to the housing 28 depending on a rotating direction by two one-way clutches F1 and F2. It should be noted that since the differential gear unit 16 is configured so as to be symmetric with respect to an axle, the lower portion thereof is omitted in FIG. 1.

The pair of the first planetary gear set 40 and second planetary gear set 42 which is provided coaxially with the input shaft 22, together with the clutches C0, C1, C2, the brakes B1 and B2, and the one-way clutch F1 make up a primary transmitting portion MG for four forward speeds and one reverse speed. The third planetary gear set 46 which is provided coaxially with the countershaft 44, together with the clutch C3, the brake B3, and the one-way clutch F2 make up a secondary transmitting portion, i.e., an under drive portion U/D. In the primary transmitting portion MG, the input shaft 22 is coupled to i) the carrier K2 of the second planetary gear set 42 via the clutch C0, ii) a sun gear S1 of the first planetary gear set 40 via the clutch C1, and iii) a sun gear S2 of the second planetary gear set 42 via the clutch C2. A ring gear R1 of the first planetary gear set 40 is coupled to the carrier K2 of the second planetary gear set 42, and a ring gear R2 of the second planetary gear set 42 is coupled to a carrier K1 of the first planetary gear set 40. The sun gear S2 of the second planetary gear set 42 is coupled to the housing 28 via the brake B1. The ring gear R1 of the first planetary gear set 40 is coupled to the housing 28 via the brake B2. The one-way clutch F1 is provided between the carrier K2 of the second planetary gear set 42 and the housing 28. A first counter gear G1, which is fixed to the carrier K1 of the first planetary gear set 40, is in mesh with a second counter gear G2, which is fixed to a ring gear R3 of the third planetary gear set 46, and power is transmitted between the primary transmitting portion MG and the under drive portion U/D. In the under drive portion U/D, a carrier K3 and the sun gear S3 of the third planetary gear set 46 are coupled together via the clutch C3. Also, in the under driver portion U/D, the brake B3 and the one-way clutch F2 are provided in parallel between the sun gear S3 and the housing 28.

The clutches C0, C1, C2, and C3 and the brakes B1, B2, B3 (hereinafter, simply referred to as "clutches C" and "brakes B", respectively, when not specified further) are hydraulic friction engaging devices, the clutches C being, for example, multi-disc clutches and the brakes B being, for example, band brakes which are controlled by hydraulic actuators. As shown in FIG. 2, these clutches C are switched between an engaged state and a disengaged state and brakes B are switched between an applied state and a released state, and each speed, i.e., five forward speeds, one reverse speed, or a neutral speed, is achieved according to a position of a shift lever (not shown). The denotations "1st" to "5th" in FIG. 2 denote the first forward speed to the fifth forward speed, respectively. In the figure, a circle indicates an engaged/applied state, an "X" indicates a disengaged/released state, and a triangle indicates an engaged state which is not related to power transmission.

Figure 3:
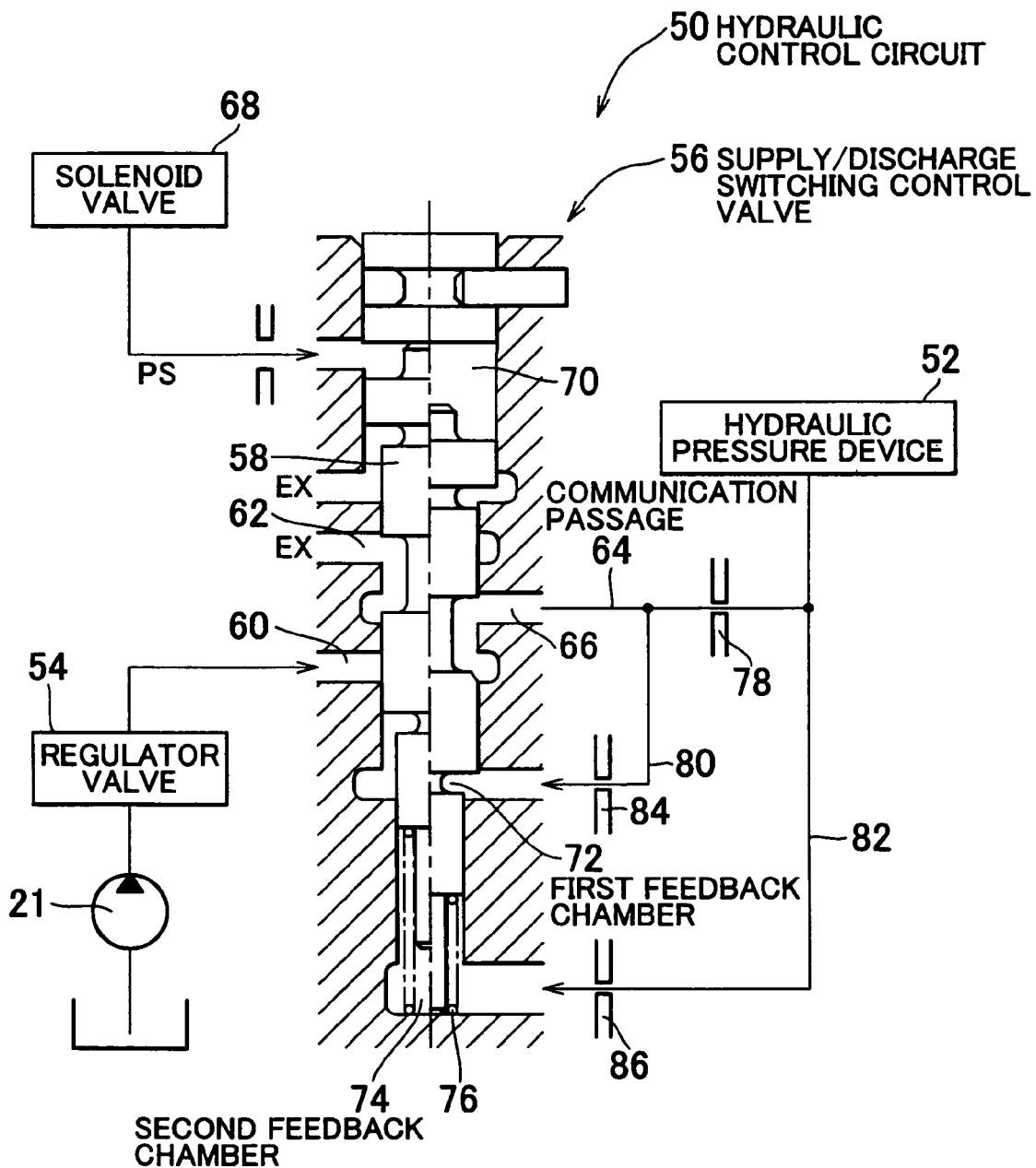
FIG. 3 is a diagram showing a hydraulic control circuit included in the drive-train unit for a vehicle shown in FIG. 1.

A hydraulic control circuit 50 in FIG. 3 is configured to engage/apply a hydraulic pressure device 52, which is one of the clutches C and the brakes B, by supplying operating oil thereto, and to disengage/release the hydraulic pressure device 52 by discharging the operating oil therefrom. The operating oil discharged from the oil pump 21 is supplied to the hydraulic pressure device 52 through a supply/discharge switching control valve 56, after the hydraulic pressure of the operating oil is adjusted so as to be a predetermined hydraulic pressure by a regulator valve 54 according to the accelerator operating amount. The hydraulic control circuit 50 corresponds to a fluid pressure control circuit, the hydraulic pressure device 52 corresponds to a fluid pressure device, and the operating oil corresponds to a fluid.

The supply/discharge switching control valve 56 corresponds to a control valve. The supply/discharge switching control valve 56 includes a spool 58 which linearly reciprocates as a valve element, and also includes a supply port 60 through which operating oil is supplied from the regulator valve 54, a discharge port 62 through which the operating oil is discharged, and a communication port 66 which is connected to the hydraulic pressure device 52 through a communication passage 64. By moving the spool 58, the communication state among the supply port 60, the discharge port 62 and the communication port 66 is continuously changed. When the spool 58 is moved downward in FIG. 3, the circulation cross sectional area of the passage between the communication port 66 and the supply port 60 is increased, and the circulation cross sectional area of the passage between the communication port 66 and the supply port 60, and the discharge port 62 is decreased, whereby the flow amount of the operating oil to be supplied from the supply port 60 to the hydraulic pressure device 52 through the communication port 66 and the communication passage 64 is increased. On the other hand, when the spool 58 is moved upward in FIG. 3, the circulation cross sectional area of the passage between the communication port 66 and the discharge port 62 is increased, and the circulation cross sectional area of the passage between the communication port 66 and the discharge port 62, and the supply port 60 is decreased, whereby the flow amount of the operating oil to be discharged from the hydraulic pressure device 52 through the communication passage 64, the communication port 66, and the discharge port 62 is increased. Each of the supply port 60 and the discharge port 62 corresponds to a supply/discharge port.

The supply/discharge switching control valve 56 includes a signal oil chamber 70, a first feedback chamber 72 and a second feedback chamber 74, which make a pair, and a return spring 76. The signal oil chamber 70 urges the spool 58 downward by being supplied with a signal hydraulic pressure PS which is controlled by the duty control of a solenoid valve 68. The first feedback chamber 72 and the second feedback chamber 74 respectively urge the spool 58 by being supplied with the hydraulic pressure in the communication passage 64. The return spring 76 urges the spool 58 upward. By moving the spool 58 such that the urging force of the signal oil chamber 70, the urging force of the first feedback chamber 72 and the second feedback chamber 74, and the urging force of the return spring 76 become equal to each other, the hydraulic pressure in the communication passage 64, and the hydraulic pressure in the hydraulic pressure device 52 are controlled according to the signal hydraulic pressure PS. Thus, when the hydraulic pressure device 52 is engaged/applied or disengaged/released during shifting, it is possible to change the hydraulic pressure thereof, that is, the engagement torque of the clutches C and the brakes B according to a predetermined change pattern, thereby performing shifting smoothly. Each of the supply/discharge switching control valve 56 and the solenoid valve 68 is provided for each of the hydraulic pressure devices 52. If necessary, each of the supply/discharge switching control valve 56 and the solenoid valve 68 is provided in plurality for each of the hydraulic pressure devices 52. Thus, the engagement torque of the clutches C and the engagement torque of the brakes B are controlled, respectively. The signal hydraulic pressure PS corresponds to the pressure regulating load. In the embodiment, the signal hydraulic pressure PS is controlled by the duty control of the solenoid valve 68. However, the signal hydraulic pressure PS may be controlled using a linear solenoid valve.

In the communication passage 64, there is formed an orifice 78 as the circulation regulating means for regulating the circulation of the operating oil. The hydraulic pressure obtained between the orifice 78 and the supply/discharge switching control valve 56 is introduced to the first feedback chamber 72 through a first feedback passage 80. Also, the hydraulic pressure obtained between the orifice 78 and the hydraulic pressure device 52 is introduced to the second feedback chamber 74 through a second feedback passage 82. As the circulation regulating means for regulating the circulation of the operating oil, an orifice 84 is formed in the first feedback passage 80, and an orifice 86 is formed in the second feedback passage 82. By appropriately setting the pressure receiving area of the first feedback chamber 72, that is, the difference in the cross sectional area between the upper land and the lower land of the first feedback chamber 72, the circulation cross sectional area of the orifice 84, the pressure receiving area of the spool 58 in the second feedback chamber 74, the circulation cross sectional area of the orifice 86, and the circulation cross sectional area of the orifice 78, it is possible to tune the responsiveness, and the overshoot and the undershoot of the fluid pressure, pressure fluctuation and the like, according to the performance required of the hydraulic pressure device 52. When importance is placed on the responsiveness, the pressure receiving area of spool 58 in the second feedback chamber 74 and the circulation cross sectional area of the orifice 86 are increased relatively, such that the effect of the fluid pressure in the second feedback passage 82 is increased, the second feedback passage 82 being connected to the communication passage 64 at a portion that is close to the hydraulic pressure device 52 compared with a portion at which the first feedback passage is connected to the communication passage 64. On the other hand, when importance is placed on the prevention of the overshoot and the undershoot of the fluid pressure and the pressure fluctuation, the pressure receiving area of spool 58 in the second feedback chamber and the circulation cross sectional area of the orifice 86 are decreased relatively, such that the effect of the fluid pressure in the second feedback passage 82 is decreased. In the embodiment, the pressure receiving area of the spool 58 in the first feedback chamber 72 and the pressure receiving area of the spool 58 in the second feedback chamber 74 are substantially the same, and tuning is performed by the orifices 78, 84, and 86 so as to obtain the desired performance.

With the hydraulic control circuit 50 according to the embodiment, the first feedback chamber 72 and the second feedback chamber 74, which make a pair, are provided in the supply/discharge switching control valve 56, and the hydraulic pressure is introduced from a portion on the upstream side of the orifice 78 provided in the communication passage 64 through the second feedback passage 82, and is introduced from a portion on the downstream side of the orifice 78 provided in the communication passage 64 through the first feedback passage 80. Therefore, the responsiveness is enhanced compared with the case where only the first feedback chamber 72 is provided. Also, the overshoot and the undershoot of the fluid pressure, and the pressure fluctuation are effectively suppressed compared with the case where only the second feedback chamber 74 is provided.

Also, by appropriately setting the pressure receiving area of the spool 58 in the first feedback chamber 72 and the pressure receiving area of the spool 58 in the second feedback chamber 74, and the circulation cross sectional areas of the orifices 78, 84, and 86, it is possible to easily tune the responsiveness, and the overshoot and the undershoot of the fluid pressure, the pressure fluctuation and the like, according to the performance required of the hydraulic pressure device 52.

Figure 4:
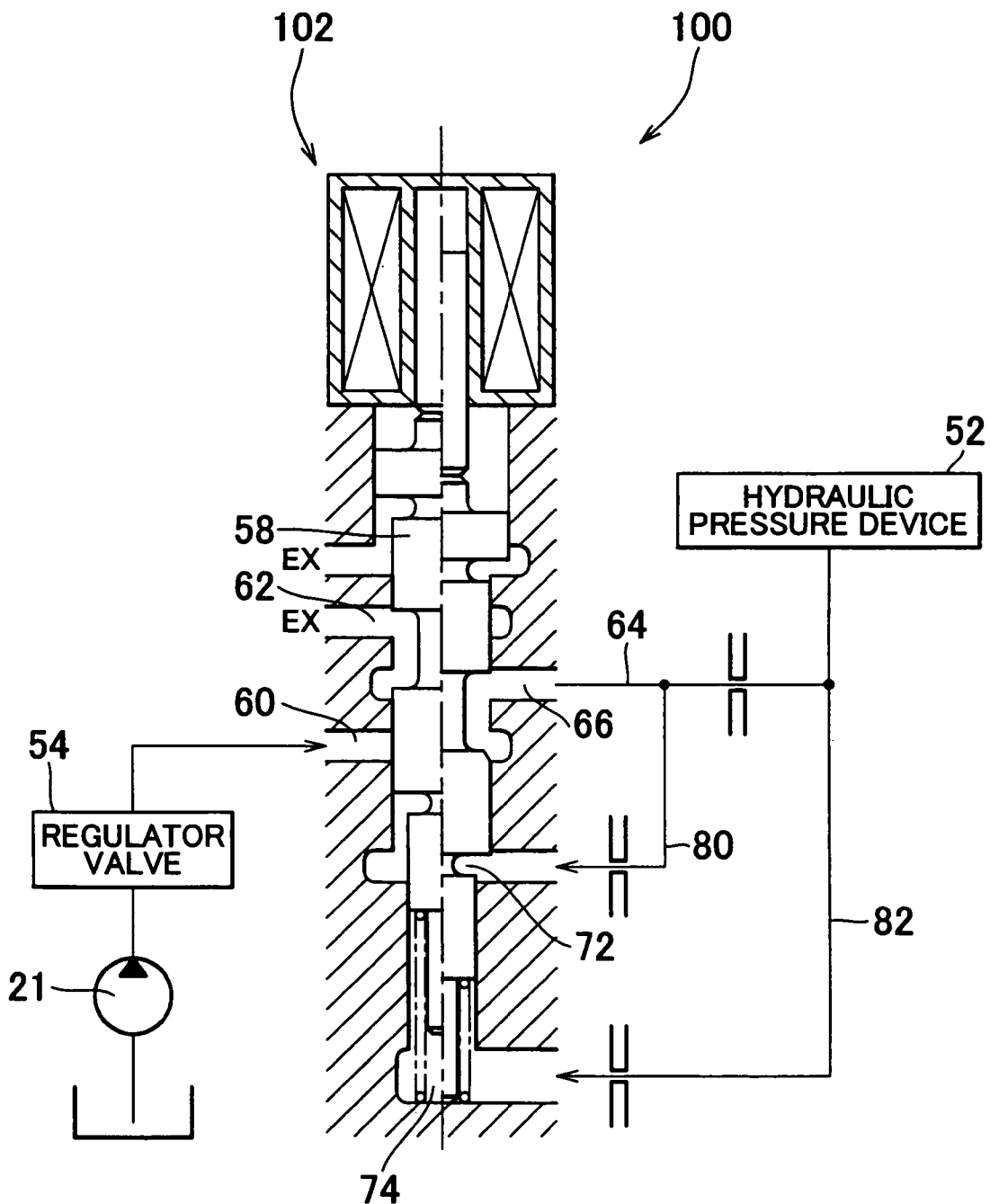
FIG. 4 is a diagram showing another embodiment of the invention and is a diagram showing a circuit corresponding to FIG. 3.

In the supply/discharge switching control valve 56 according to the embodiment, the pressure regulating load is applied to the spool 58 by supplying the signal hydraulic pressure PS from the solenoid valve 68 to the signal oil chamber 70. However, as in a supply/discharge switching control valve 100 shown in FIG. 4, a supply/discharge switching control valve may be integrally provided with a solenoid 102, and the pressure regulating load may be directly applied to the spool 58 due to excitation of the solenoid 102.

While the invention has been described in detail with reference to the exemplary embodiment with reference to accompanying drawings, it will be apparent to those skilled in the art that the invention is not limited to the above-mentioned embodiment, and that the invention may be realized in various other embodiments within the scope of the invention.

What is claimed is:

1. A fluid pressure control circuit, comprising:
   a fluid pressure device which is operated by a fluid pressure;
   a supply/discharge port through which a fluid is supplied/discharged;
   a communication port which is connected to the fluid pressure device through a communication passage;
   a control valve which controls the fluid pressure of the fluid pressure device by changing a flow amount of the fluid to be supplied to or to be discharged from the fluid pressure device through the communication port and the supply/discharge port, the flow amount of the fluid being changed by a change in a communication state between the communication port and the supply/discharge port according to movement of a valve element, the movement of the valve element being determined by a ratio between the fluid pressure to be introduced from the communication passage into a feedback chamber and, a predetermined pressure regulating load;
   a circulation regulating mechanism that is provided in the communication passage, and regulates circulation of the fluid;
   a first feedback chamber and a second feedback chamber which are provided in the control valve and which respectively apply the fluid pressure to the valve element in the same direction;
   a first feedback passage which introduces the fluid to the first feedback chamber from a portion that is between the circulation regulating mechanism and the control valve in the communication passage; and
   a second feedback passage which introduces the fluid to the second feedback chamber from a portion that is between the circulation regulating mechanism and the fluid pressure device in the communication passage.

2. The fluid pressure control circuit according to claim 1, wherein the circulation regulating mechanism causes a difference in the fluid pressure between the upstream side and the down stream side of the circulation regulating mechanism using a circulation resistance according to the flow amount of the fluid.

3. The fluid pressure control circuit according to claim 2, wherein the circulation regulating mechanism is an orifice.

4. The fluid pressure control circuit according to claim 1, further comprising a second circulation regulating mechanism provided in the first feedback passage, for regulating circulation through the first feedback passage.

5. The fluid pressure control circuit according to claim 4, wherein the second circulation regulating mechanism is an orifice.

6. The fluid pressure control circuit according to claim 1, further comprising a third circulation regulating mechanism provided in the second feedback passage, for regulating circulation through the second feedback passage.

7. The fluid pressure control circuit according to claim 6, wherein the third circulation regulating mechanism is an orifice.

8. The fluid pressure control circuit according to claim 1, further comprising a solenoid valve that applies the pressure regulating load.

9. The fluid pressure control circuit according to claim 8, wherein the pressure regulating load is a signal hydraulic pressure controlled by a duty control of the solenoid valve.

10. The fluid pressure control circuit according to claim 8, wherein the solenoid valve is integrally provided with the control valve, and directly applies the pressure regulating load to the valve element.

11. A fluid pressure control circuit, comprising:
    a fluid pressure device which is operated by a fluid pressure;
    a supply/discharge port through which a fluid is supplied/discharged;
    a communication port which is connected to the fluid pressure device through a communication passage;
    a control valve which controls the fluid pressure of the fluid pressure device by changing a flow amount of the fluid to be supplied to or to be discharged from the fluid pressure device through the communication port and the supply/discharge port, the flow amount of the fluid being changed by a change in a communication state between the communication port and the supply/discharge port according to movement of a valve element, the movement of the valve element being determined by a ratio between the fluid pressure to be introduced from the communication passage into a feedback chamber and, a predetermined pressure regulating load;
    circulation regulating means provided in the communication passage, for regulating circulation of the fluid;
    a first feedback chamber and a second feedback chamber which are provided in the control valve and which respectively apply the fluid pressure to the valve element in the same direction;
    a first feedback passage which introduces the fluid to the first feedback chamber from a portion that is between the circulation regulating means and the control valve in the communication passage; and
    a second feedback passage which introduces the fluid to the second feedback chamber from a portion that is between the circulation regulating means and the fluid pressure device in the communication passage.

* * * * *